United States Patent
Kemenczy et al.

(10) Patent No.: US 7,894,559 B2
(45) Date of Patent: **\*Feb. 22, 2011**

(54) WIRELESS COMMUNICATIONS DEVICE INCLUDING A JOINT DEMODULATION FILTER FOR CO-CHANNEL INTERFERENCE REDUCTION AND RELATED METHODS

(75) Inventors: Zoltan Kemenczy, Mississauga (CA); Huan Wu, Kanata (CA); Sean Simmons, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/629,199

(22) Filed: Dec. 2, 2009

(65) Prior Publication Data

US 2010/0074354 A1 Mar. 25, 2010

Related U.S. Application Data

(63) Continuation of application No. 11/466,568, filed on Aug. 23, 2006, now Pat. No. 7,639,763.

(60) Provisional application No. 60/710,565, filed on Aug. 23, 2005.

(51) Int. Cl.
  *H04B 1/10* (2006.01)
  *H04L 27/06* (2006.01)
(52) U.S. Cl. ...................... 375/350; 375/341
(58) Field of Classification Search ........... 375/262, 375/285, 350, 341, 229–231
  See application file for complete search history.

(56) References Cited

U.S. PATENT DOCUMENTS 5,349,607 A 9/1994 Moreno ...................... 375/94

(Continued)

FOREIGN PATENT DOCUMENTS

EP 0952711 10/1999

(Continued)

OTHER PUBLICATIONS

Samanta, *Joint Co-channel Interference Cancellation and Channel Shortening with Space-Time Processing*, Wireless Systems Innovations Laboratory, University of Texas at Austin, Spring 2003.

(Continued)

*Primary Examiner*—Tesfaldet Bocure
(74) *Attorney, Agent, or Firm*—Allen, Dyer, Doppelt, Milbrath & Gilchrist, P.A.

(57) ABSTRACT

A wireless communications device may include a housing and a wireless transmitter and a wireless receiver carried by the housing. The wireless receiver may include a joint demodulation filter for reducing co-channel interference between a desired signal and a co-channel interfering signal which may include an input receiving samples of the desired signal and the co-channel interfering signal, a Viterbi decoder, and a first signal path between the input and the Viterbi decoder comprising a first filter. The joint demodulation filter may further include a second signal path between the input and the Viterbi decoder and comprising a linear finite impulse response (FIR) modeler for generating a channel impulse response estimate for the co-channel interfering signal. Additionally, a third signal path may be between the input and the Viterbi decoder and include a whitened matched filter for generating a channel impulse response estimate for the desired signal.

20 Claims, 5 Drawing Sheets

U.S. PATENT DOCUMENTS

| | | | | |
|---|---|---|---|---|
| 5,493,307 | A | 2/1996 | Tsujimoto | 342/380 |
| 5,528,625 | A | 6/1996 | Ayanoglu et al. | 375/222 |
| 6,154,443 | A | 11/2000 | Huang et al. | 370/210 |
| 6,330,294 | B1 | 12/2001 | Ansbro et al. | 375/347 |
| 6,714,607 | B2 | 3/2004 | Kobylinski et al. | 375/341 |
| 6,724,809 | B2 | 4/2004 | Reznik | 375/148 |
| 6,775,260 | B1 | 8/2004 | Dabak et al. | 370/342 |
| 7,155,660 | B1 | 12/2006 | Burd | 714/795 |
| 7,257,174 | B2 | 8/2007 | Dornstetter et al. | 375/343 |
| 7,295,636 | B2 | 11/2007 | Onggosanusi et al. | 375/346 |
| 7,487,432 | B2 | 2/2009 | Ashley et al. | 714/796 |
| 2004/0017863 | A1 | 1/2004 | Learned | 375/340 |
| 2004/0081074 | A1 | 4/2004 | Piechocki | 370/206 |
| 2004/0141565 | A1 | 7/2004 | Kwak et al. | 375/267 |
| 2004/0234004 | A1 | 11/2004 | Ketchum et al. | 375/267 |
| 2008/0159452 | A1 | 7/2008 | Kelley | 375/349 |

FOREIGN PATENT DOCUMENTS

| | | |
|---|---|---|
| WO | 2007/022626 | 3/2007 |

OTHER PUBLICATIONS

Pipon et al., *Multichannel Receivers Performance Comparison in the Presence of ISI and CCI*, Thomson-CSF Communications, IEEE Digital Signal Processing Proceedings, 1997. DSP 97, 1997 13th International Conference on Publication Date: Jul. 2-4, 1997, vol. 1, pp. 371-374.

Liang et al., *A Two-Stage Hybrid Approach for CCI/ISI Reduction with Space-Time Processing*, IEEE Communications Letters, vol. 1, No. 6, Nov. 1997.

Spagnolini, *Adaptive Rank-One Receiver for GSM/DCS Systems*, IEEE Transactions on Vehicular Technology, vol. 51, No. 5, Sep. 2002.

Ding et al., *Single-Channel Blind Equalization for GSM Cellular Systems*, IEEE Journal on Selected Areas in Communications, vol. 16, No. 8, Oct. 1998.

Seshadri, *Joint Data and Channel Estimation Using Blind Trellis Search Techniques*, IEEE Transactions on Communications, vol. 42, No. 2/3/4, Feb./Mar./Apr. 1994.

Daneshgaran et al., *Blind Estimation of Output Labels of SIMO Channels Based on a Novel Clustering Algorithm*, IEEE Communication Letters, vol. 2, No. 11, Nov. 1998, pp. 307-309.

Pedersen et al., *SAIC Helps Combat Interference*, CommsDesign, Aug. 15, 2005, available at www.commdesign.com.

WIRELESS COMMUNICATIONS DEVICE INCLUDING A JOINT DEMODULATION FILTER FOR CO-CHANNEL INTERFERENCE REDUCTION AND RELATED METHODS

CROSS-REFERENCE TO RELATED APPLICATIONS

This application is a continuation of Ser. No. 11/466,568 filed Aug. 23, 2006, now U.S. Pat. No. 7,639,763 issued Dec. 29, 2009, which claims the benefit of U.S. Provisional Application No. 60/710,565, filed Aug. 23, 2005, which is both of which are hereby incorporated herein in its entirety their entireties by reference.

FIELD OF THE INVENTION

The present invention relates to wireless communications systems, such as cellular communications systems, and, more particularly, to filtering received wireless signals to reduce unwanted interference.

BACKGROUND

Cellular, communications systems continue to grow in popularity and have become an integral part of both personal and business communications. Cellular telephones allow users to place and receive voice calls most anywhere they travel. However, with ever increasing numbers of cellular phone users comes greater challenges for wireless communications device and network providers. One such challenge is addressing interference caused between multiple cellular devices operating in a given geographical area. Cellular devices communicate with a cellular base station using common or shared wireless communications channels (i.e., frequencies). Yet, in some cases signals between other devices and a base station using the same channel may cause a desired signal from the base station to be significantly degraded or even dropped by the handheld device. Such interference is called co-channel interference.

Because of the increasing load on cellular communications infrastructures, various single-antenna interference cancellation (SAIC) approaches have been investigated to meet requirements for Downlink Advanced Receiver Performance (DARP). This effort is being standardized by the third generation mobile communications system and the Third Generation Partnership Project (3GPP).

One SAIC technique that has been investigated is based upon joint demodulation of the desired and interfering sequences. Generally speaking, this approach begins with a standard least-squares (LS) estimate of the propagation channel and a static channel profile for the interferer. Then, a modified Viterbi decoder is used in which half of the state bits represent the user sequence and the other half represent the interferer. A joint branch metric is minimized and the estimated sequences for the desired and interfering signal are used in a least mean squares (LMS) algorithm to update the channel estimates for both the desired and interfering propagation channel.

The 3GPP initiative has given consideration to the application of joint demodulation in synchronized wireless networks. See, e.g., "Feasibility Study on Single Antenna Interference Cancellation (SAIC) for GSM Networks," 3GPP TR 45.903 Version 6.0.1, Release 6, European Telecommunications Standards Institute, 2004. This is the more limited case that requires one to assume that the base station synchronization data sequences (i.e., training sequences) of the desired signal and dominant-interferer overlap, which in turn makes the estimation of the CIRs possible using previously known techniques. It also requires one to assume that the interferer will be dominant for the entire burst.

However, in asynchronous network applications the training sequences of interfering signals may not overlap those of the desired signal, which makes CIR estimation problematic. Accordingly, further developments may be desirable to make joint demodulation techniques practical to implement in both synchronous and asynchronous networks.

DETAILED DESCRIPTION OF THE PREFERRED EMBODIMENTS

Figure 1:
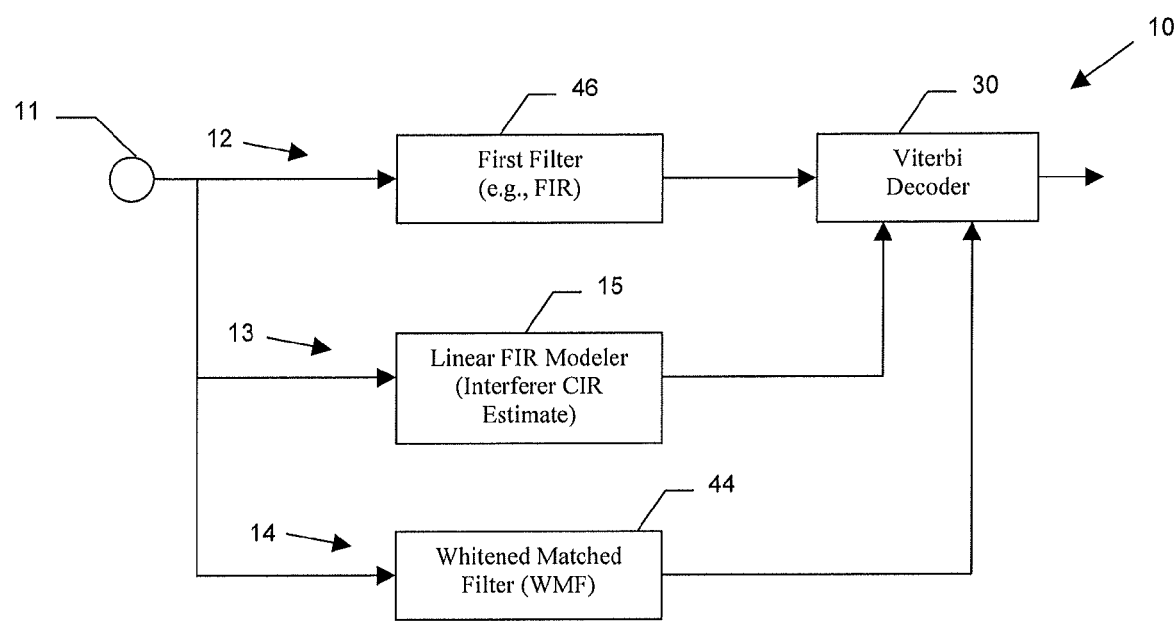
FIG. 1 is a schematic block diagram of an exemplary Single Antenna Interference Cancellation (SAIC) enabled joint demodulation Global System for Mobile Communication (GSM) receiver in accordance with the present invention.

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a wireless communications device including a housing and a wireless transmitter and a wireless receiver carried by the housing is described herein. In particular, the wireless receiver may include a joint demodulation filter for reducing co-channel interference between a desired signal and a co-channel interfering signal. The joint demodulation filter may include an input receiving samples of the desired signal and the co-channel interfering signal, a Viterbi decoder, and a first signal path between the input and the Viterbi decoder comprising a first filter. The joint demodulation filter may further include a second signal path between the input and the Viterbi decoder and comprising a linear finite impulse response (FIR) modeler for generating a channel impulse response estimate for the co-channel interfering signal. Additionally, a third signal path may be between the input and the Viterbi decoder and include a whitened matched filter for generating a channel impulse response estimate for the desired signal.

More particularly, the desired signal and the co-channel interfering signal may each include a training sequence, and the joint demodulation filter may further include a training-sequence locator upstream of the second and third paths and downstream from the input. Additionally, the third signal path may include a desired-signal channel impulse response (CIR)

estimator upstream of the whitened matched filter for generating a desired-signal CIR estimate. Furthermore, the first filter may be a first finite impulse response (FIR) filter.

The second signal path may include a first summer and a second summer connected downstream therefrom. Moreover, the second signal path may further include a remodulator between the desired-signal CIR estimator and the first summer and cooperating therewith for subtracting a remodulated desired-signal training sequence from samples of the desired signal and the co-channel interfering signal to thereby generate an interference signal estimate. In addition, the linear FIR modeler may include a blind interference and CIR estimator, and a second FIR filter downstream from the blind interference and CIR estimator. The Viterbi decoder may also iteratively build a tree of interferer bit sequence hypotheses.

A joint demodulation filtering method for reducing co-channel interference between a desired signal and a co-channel interfering signal in a wireless communications receiver may include filtering receiving samples of the desired signal and the co-channel interfering signal using a first signal path comprising a first filter. The method may further include generating a channel impulse response estimate for the co-channel interfering signal using a second signal path comprising a linear finite impulse response (FIR) modeler, and generating a channel impulse response estimate for the desired signal using a third signal path comprising a whitened matched filter. In addition, a decoding operation may be performed based upon the filtered received samples of the desired signal and the co-channel interfering signal, the channel impulse response estimate for the co-channel interfering signal, and the channel impulse response estimate for the desired signal using a Viterbi decoder.

Figure 2:
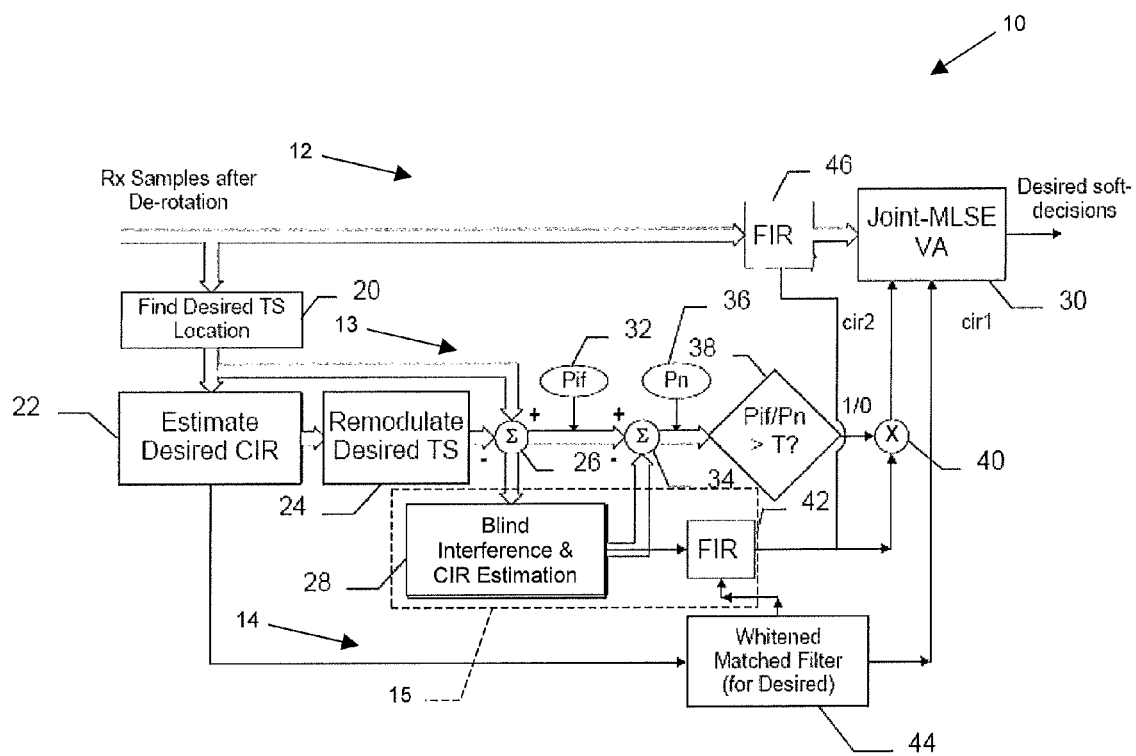
FIG. 2 is a schematic block diagram of an exemplary embodiment of the joint demodulation receiver of FIG. 1 shown in greater detail.

Turning first to FIGS. 1 and 2, a joint demodulation filter 10 in accordance with an exemplary embodiment illustratively includes an input 11 receiving samples of a desired signal and a co-channel interfering signal, e.g., from the antenna of a wireless communications device (e.g., a mobile cellular device). That is, the joint demodulation filter 10 may advantageously be implemented in a wireless receiver of a mobile wireless communications device. The various components of the joint demodulation filter 10 may be implemented using software modules and a processing circuitry, such as a digital signal processor (DSP), for example, although other implementations are also possible, as will be appreciated by those skilled in the art. Exemplary components of a mobile cellular device in which the joint demodulation filter 10 may be used will be discussed further below with reference to FIG. 5.

The joint demodulation filter 10 further illustratively includes a Viterbi decoder 30, and a first signal path 12 between the input 11 and the Viterbi decoder comprising a first filter 46. In the exemplary embodiment shown in FIG. 2, the first filter 46 may be a finite infinite response (FIR) filter, such as a matched filter, for example. Also, a second signal path 13 is included between the input 11 and the Viterbi decoder 30. The second signal path 13 illustratively includes a linear FIR modeler 15 for generating a channel impulse response estimate for the co-channel interfering signal. Additionally, a third signal path 14 is illustratively connected between the input 11 and the Viterbi decoder 30. The third signal branch illustratively includes a whitened matched filter 44 for generating a channel impulse response estimate for the desired signal, as will be discussed further below.

Additional components of the exemplary joint demodulation filter 10 illustrated in FIG. 2 will now be briefly identified, followed by a description of the various functions thereof. As noted above, in a cellular communications GSM-based network, for example, a desired signal and a co-channel interfering signal will each include a training sequence. The joint demodulation filter 10 illustratively includes a training-sequence locator 20 for the desired signal upstream of the second and third paths 13, 14 and downstream from the input 11. The third signal path 14 illustratively includes a desired-signal CIR estimator 22 upstream of the whitened matched filter 44 for generating a desired-signal CIR estimate.

The second signal path 13 also illustratively includes a first summer 26, a second summer 34 connected downstream from the first summer, and a remodulator 24 between the desired-signal SIR estimator 22 and the first summer and cooperating therewith for subtracting a remodulated desired-signal training sequence from samples of the desired signal and the co-channel interfering signal to thereby generate an interference signal estimate. The linear FIR modeler 15 illustratively includes a blind interference and CIR estimator 28, coupled to the summer 26, and a second FIR filter 42 downstream from the blind interference and SIR estimator 28, which also receives an input from the whitened matched filter 44. The second summer 34 also receives an output of the blind interference and CIR estimator 28, as shown.

The second signal path 13 further illustratively includes a residual noise power (Pn) sample offset block 32 between the first and second summers 26, 34, a significant interferer component (Pif) sample offset block downstream from the second summer, and a Pif/Pn decision block 38 downstream from the Pif sample offset block, as will be discussed further below. A mixer 40 is downstream from the Pif sample offset block 38 and also receives an output of the second FIR filter 42 as shown. The output of the mixer 40 and the output of the whitened matched filter 44 are provided to the Viterbi decoder 30, as is the output of the first FIR 46.

The operation of the joint demodulation receiver 10 will now be described in further detail. As noted above, the joint demodulation (JD) receiver 10 may advantageously be used in wireless communications systems, such as in cellular base stations and mobile cellular communications devices, for example. Generally speaking, joint demodulation uses estimates for a channel impulse response (CIR) for a desired signal and a dominant interferer associated therewith. For a GSM implementation, which will be discussed below, it will be assumed that the dominant interferer is a GMSK modulated signal conforming to the GSM specification.

The joint demodulation approach set forth herein may be applicable to both synchronized and unsynchronized networks, in that this technique uses "blind" interferer data and channel estimation techniques rather than making the above-noted assumptions. Once the CIRs have been estimated, a two-dimensional (joint) adaptive Viterbi state structure may be used in the equalizer to estimate the data for both the desired signal and the interferer.

Simulations of the present joint demodulation technique have demonstrated greater than 10 dB carrier-to-interference (C/I) improvement at about 0 dB C/I in the raw symbol error rate and frame error, rate for 12.2-rate AMR FS speech. In the simulations, a new joint-least-squares based technique was used for channel-offset positioning and desired and interferer CIR estimation. As noted above, this approach is coupled with blind estimation of the interferer data (i.e., with no a-priori knowledge of the interferer's data).

The present joint demodulation approach may be particularly advantageous in its ability to provide relatively high gains (i.e., in its ability to receive at very low signal-to-noise ratios (SNRs)) when limited a-priori knowledge about the interferer is available, as will be discussed further below. Yet, the Viterbi algorithm (VA) complexity may also increase, (depending on the number of states used to model the interferer), thus the processing requirements and the additional complexity of the channel/data estimators may be a factor in some software or hardware implementations.

For the test configuration, a system level Block Error Rate (BLER) simulator was extended to support all of the interferer models/scenarios being used by the 3GPP DARP work group. This extension also allows new interferer models to be developed as needed. The simulations were performed using Matlab.

The joint demodulation approach assumes that the dominant interference component may be modeled as the noisy output of a finite-impulse-response (FIR) (unknown) filter with unknown, binary, random input (interferer) data. In the case of a dominant GMSK-modulated interferer, this assumption holds even if there are additional, weaker interference signals present, which are treated as residual noise. Moreover, this approach may be applied to other interferer modulation types using the above modeling assumption.

Referring again to FIG. 2, the steps associated with the joint demodulation approach are as follows. First, a base station training sequence (TS) for the desired signal is found (Block 20), the CIR for the desired signal is estimated (Block 22), and the re-modulated desired training sequence is removed from the input samples to form the interferer-signal estimate (Block 24). Furthermore, the "blind" estimation of the interferer CIR and data is performed based upon the interferer-signal estimate, at Blocks 26, 28. Next, a joint least-squares desired/interferer channel estimation using the desired training sequence and estimated interferer data is performed at Block 30, as will be discussed further below.

In addition, the foregoing steps may be repeated (or performed in a vectorized form) at multiple input sample offsets (as the timing offset varies). As such, the offset yielding the minimal residual noise power (Pn) may be selected, and a determination may be made as to whether the model applies (i.e., was a significant interferer component (Pif) detected or not), at Blocks 32, 34, 36, and 38. If so, demodulation is performed using a joint-demodulation (multi-dimensional state) Viterbi algorithm that estimates and removes the interference jointly with the estimation of the desired-signal data (Block 30).

Initially, the desired channel impulse response was estimated using a conventional training-sequence correlation (i.e., "channel-sounding") method, as will be appreciated by those skilled in the art. At low C/I levels, the least-squares method provides the initial desired channel impulse response estimate by multiplying the input samples by a constant (pre-computed) matrix $(A^H A)^{-1} A^H$, where A is the training-sequence convolution matrix of the desired signal.

For estimating the interferer, the above-noted SAIC Feasibility Study assumes a synchronous network model. More particularly, this model assumes that the training sequence of the interfering signal is aligned with the desired signal's training sequence within a −1 to +4 symbol offset. In this case, the interferer channel impulse response can be estimated using the training-sequence correlation technique (or least squares, since the training-sequence data is known) after removing the desired signal's (re-modulated) training sequence from the received samples.

However, to widen the potential applicability of the joint-demodulation approach to the asynchronous network case where the interferer data during the desired signal's training sequence is unknown, blind channel and data estimation and demodulation techniques are used. By way of background in this regard, reference is made to the article by Seshadri entitled "Joint Data and Channel Estimation Using Blind Trellis Search Techniques," IEEE Trans. on Communications, vol. 42, no. 2/3/4, pgs. 1000-1011, and the article by Daneshgaran et al. entitled "Blind Estimation of Output Labels of SIMO Channels Based on a Novel. Clustering Algorithm," IEEE Communications Letters, vol. 2, no. 11, November 1998, pgs. 307-309, both of which are hereby incorporated herein in their entireties by reference.

One particular difficulty of performing blind interferer estimation is the very small number of "observable" interferer (i.e., noisy) samples during the desired signal's training-sequence window. By way of reference, the sequence window is the length of the desired training sequence (for this embodiment, the training sequence length is 26, as defined by the GSM 05-series standards) less the desired signal's CIR length (5 is chosen by this simulation, however other values between 1 and 7 are possible depending on the channel models as defined by the GSM standards) plus one, or: 26−5+1=22 (twenty-two) in the present example.

This approach uses an algorithm which combines concepts of vector quantization and sequential decoding of convolutional codes. The algorithm is based on two assumptions: (1) the interferer signal may be modeled with a linear Finite Impulse Response (FIR) source (Block 28); and (2) the interferer signal is corrupted by residual additive white (i.e., uncorrelated) Gaussian noise (after removing the estimated desired signal) (FIG. 1, 26).

With these two assumptions, the algorithm iteratively builds a tree of interferer bit sequence hypotheses. For each new bit added to a bit sequence hypothesis, it computes the new FIR state (or codebook index, as will be apparent to those skilled in the art of vector quantization) and averages all input samples corresponding to the same state in a particular sequence to estimate the FIR output (codebook value) for that state. The distortion of a bit sequence is what remains after removing the sequence's FIR outputs from the input samples (FIG. 2, 36). After keeping up to W (search width parameter) bit sequences with the lowest distortions, each sequence is extended by another 0/1 bit to yield two new sequences (2 W total), and the process of re-estimating FIR outputs of each sequence is repeated followed by keeping the W sequences with minimum distortion (e.g., one-half the sequences). When the sequence length reaches the number of interferer-signal samples available (22 for this embodiment, as described above), the sequence with the lowest distortion out of W candidates is chosen.

This above-described algorithm provides the initial interferer data and channel impulse response estimates for subsequent joint least-squares desired-signal and interferer-channel estimation. At C/I levels below 5 dB, the CIR position (offset), and CIR value estimation for the desired and interferer is affected by the cross-correlation of the desired and interferer data sequences. However, using the previously obtained interferer data estimate, a joint least-squares channel estimation is possible that removes (i.e., accounts for) this cross-correlation as follows:

$$\begin{vmatrix} A' \\ B' \end{vmatrix} s = \begin{vmatrix} A'A & B'A \\ A'B & B'B \end{vmatrix} \begin{vmatrix} h \\ g \end{vmatrix},$$

where s contains the input samples during the desired training-sequence window (26−5+1=22 as described previously), A (N×Lh) and B (N×Lg) are the desired-signal and interferer data-sequence convolution matrices (A is known and constant, B is an estimate for the interferer), and h and g are the desired-signal and interferer CIRs respectively that result from solving the above equations with Lh (5 in this embodiment) the length of h, and Lg (3 chosen for this embodiment) the length of g.

Once estimates of the desired and interferer channel impulse responses are available, a two-dimensional state Viterbi algorithm may be applied. For a Euclidean distance metric, the whitened discrete time model filter (WMF) is computed from the estimated desired CIR (Block 44). The computation is also applied to the interferer CIR, and the three (Lg) largest resulting taps are used to form the interferer codebook (i.e., a set of possible interferer channel FIR outputs). Of course, other numbers of taps Lh and Lg may also be used in some embodiments.

The resulting desired-signal and interferer codebooks are passed to the joint-demodulation Viterbi algorithm. The returned soft-decision metrics include the forward and backward recursion using the difference of the odd/even state minimum metrics at each stage (not path) as the soft decision value and sign.

Figure 3:
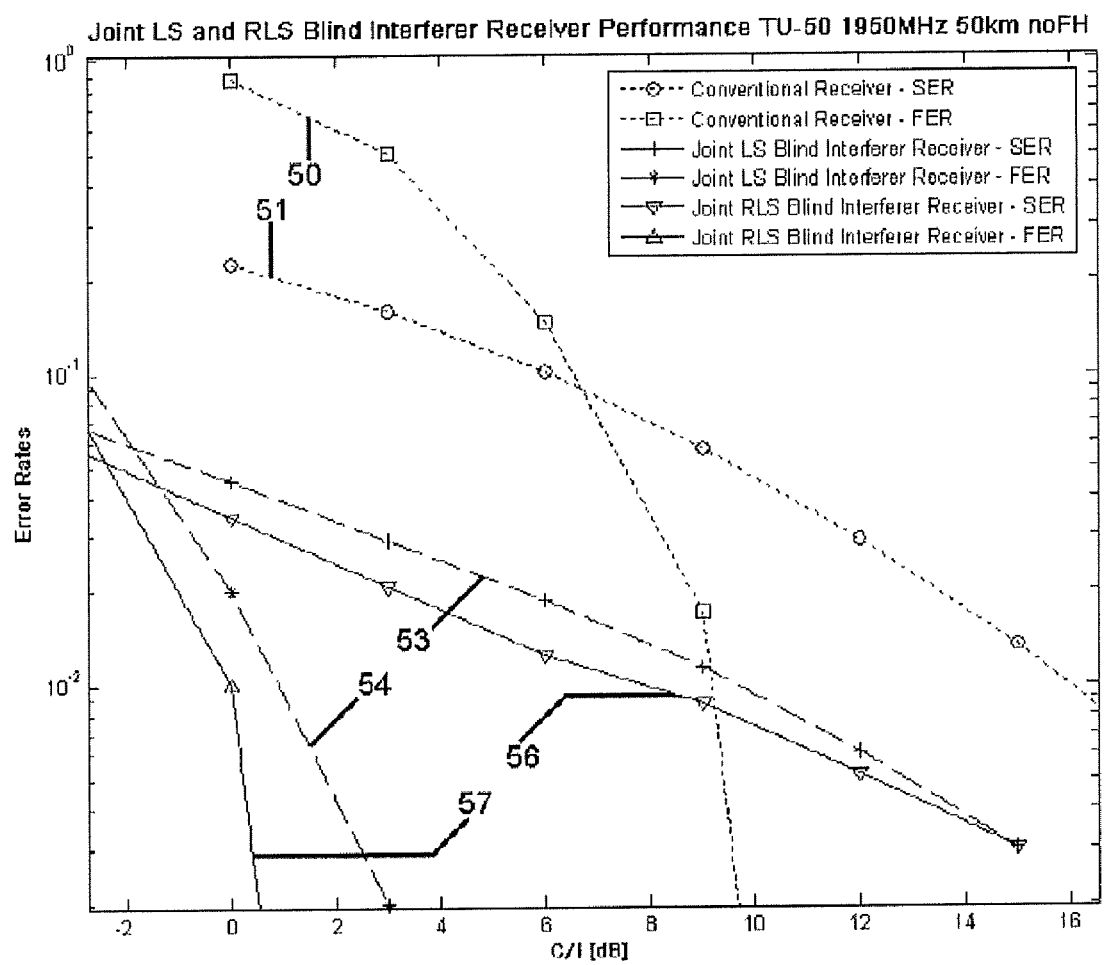
FIG. 3 is a graph of simulated performance results for an SAIC joint demodulation receiver in accordance with the present invention and a typical GMSK receiver in accordance with the prior art.

Turning now to FIG. 3, simulated results for TCH-AFS 12.2 rate speech for a typical urban fading profile at 50 km vehicle speeds (TU-50) at the 1950 MHz band without the use of frequency hopping and using interfere model DTS1 are shown, as will be appreciated by those skilled in the art. C/I is the average carrier-to-interference ratio.

The dotted lines 50 and 51 represent the SER (symbol error rate) and FER (frame error rates) of the conventional GMSK receiver. The dashed lines 53 and 54 represent the performance of the above-described SAIC-JD receiver. The solid lines 55 and 56 represent the performance of a higher-complexity SAIC-JD receiver in accordance with an exemplary embodiment of the invention in which the blind vector quantization of the interferer is performed using recursive least squares (RLS) updates while the interferer symbol sequence hypotheses are formed and evaluated. As will be appreciated by those skilled in the art, the performance plot demonstrates that both of the SAIC-JD receivers provide significant improvement over the conventional receiver in a high interference environment.

The amount of residual "noise" power remaining in the desired signal's training-sequence window after removing the desired (i.e., estimated) samples may be used as a test of model "fit" in some embodiments. If removing the subsequently estimated interferer does not reduce the residual power significantly, a non-interference signal model may be selected, and vice-versa.

Figure 4:
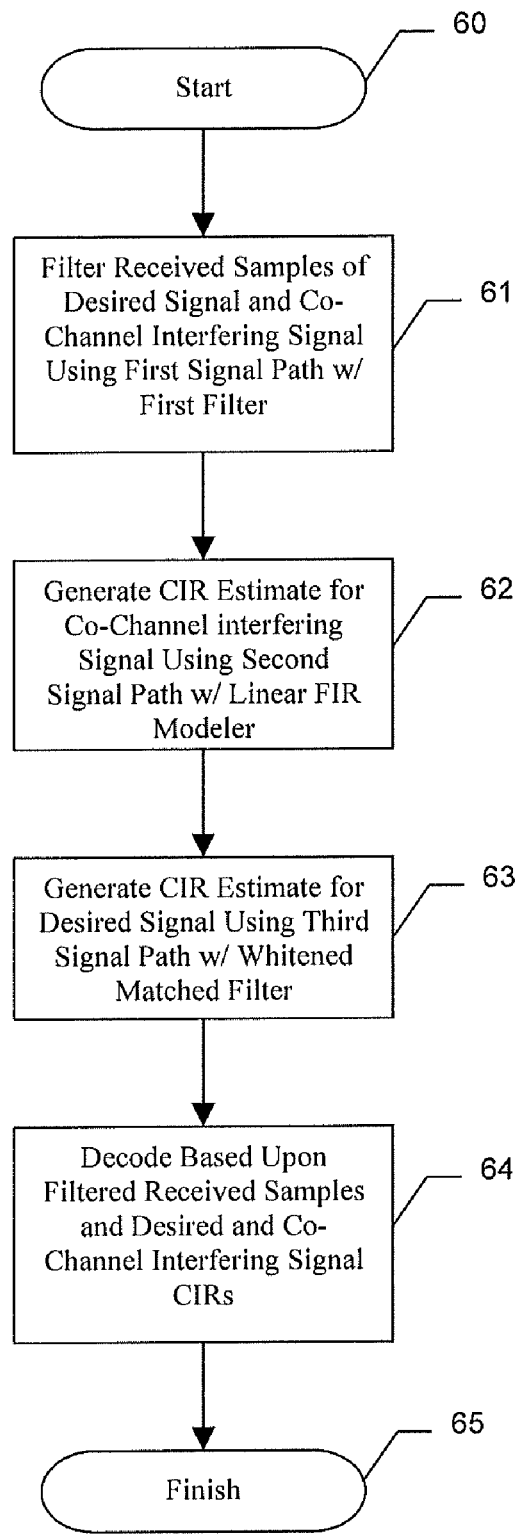
FIG. 4 is a flow diagram of an exemplary joint demodulation filtering method for reducing co-channel interference between a desired signal and a co-channel interfering signal in accordance with the invention.

A joint demodulation filtering method for reducing co-channel interference between a desired signal and a co-channel interfering signal will now be described with reference to FIG. 4. Beginning at Block 60, receiving samples of the desired signal and the co-channel interfering signal are filtered using a first signal path 12 comprising a first filter 46, at Block 61. The method may further include generating a channel impulse response estimate for the co-channel interfering signal using a second signal path 13 comprising a linear finite impulse response (FIR) modeler 15, at Block 62, and generating a channel impulse response estimate for the desired signal using a third signal path 14 comprising a whitened matched filter 44, at Block 63. In addition, a decoding operation may be performed based upon the filtered received samples of the desired signal and the co-channel interfering signal, the channel impulse response estimate for the co-channel interfering signal, and the channel impulse response estimate for the desired signal using a Viterbi decoder 30, at Block 64, thus concluding the illustrated method (Block 65).

One example of a hand-held mobile wireless communications device 1000 that may be used in accordance with the system 20 is further described in the example below with reference to FIG. 5. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 5:
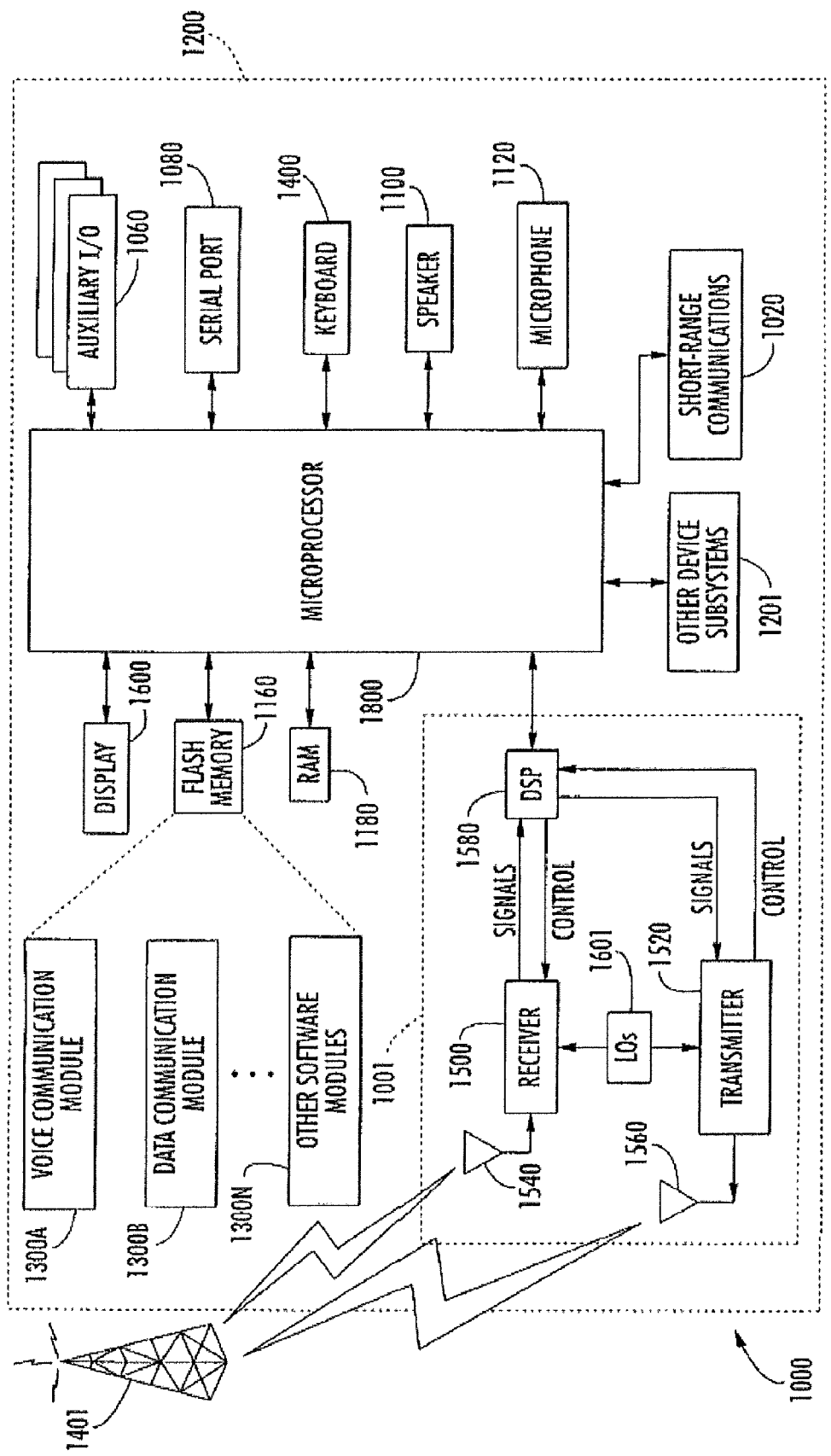
FIG. 5 is a schematic block diagram of an exemplary wireless communication device in which the joint demodulation receiver of FIG. 1 may be used.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other, voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications device comprising:
a housing; and
a wireless transmitter and a wireless receiver carried by said housing;
said wireless receiver comprising a joint demodulation filter configured to reduce co-channel interference between a desired signal and a co-channel interfering signal, the joint demodulation filter comprising
an input configured to receive samples of the desired signal and the co-channel interfering signal,
a decoder,
a first signal path between said input and said decoder and comprising a first filter,
a second signal path between said input and said decoder and comprising a modeler configured to generate a channel impulse response estimate for the co-channel interfering signal, and
a third signal path between said input and said decoder and comprising a second filter configured to generate a channel impulse response estimate for the desired signal.

2. The wireless communications device of claim 1 wherein the desired signal and the co-channel interfering signal each includes a training sequence; and wherein said joint demodulation filter further comprises a training-sequence locator upstream of said second and third paths and downstream from said input.

3. The wireless communications device of claim 1 wherein said third signal path comprises a desired-signal channel impulse response (CIR) estimator upstream of said second filter configured to generate a desired-signal CIR estimate.

4. The wireless communications device of claim 1 wherein said first filter comprises a first finite impulse response (FIR) filter.

5. The wireless communications device of claim 3 wherein said second signal path comprises a first summer and a second summer connected downstream therefrom.

6. The wireless communications device of claim 5 wherein said second signal path further comprises a remodulator between said desired-signal CIR estimator and said first summer and cooperating therewith for subtracting a remodulated desired-signal training sequence from samples of the desired signal and the co-channel interfering signal to thereby generate an interference signal estimate.

7. The wireless communications device of claim 1 wherein said modeler comprises a blind interference and CIR estimator, and a second finite impulse response (FIR) filter downstream from said blind interference and CIR estimator.

8. The wireless communications device of claim 1 wherein said decoder iteratively builds a tree of interferer bit sequence hypotheses.

9. The wireless communications device of claim 1 wherein said wireless receiver comprises a cellular receiver.

10. A wireless communications device comprising:
a housing; and
a wireless transmitter and a wireless receiver carried by said housing;

said wireless receiver comprising a joint demodulation filter configured to reduce co-channel interference between a desired signal and a co-channel interfering signal where the desired signal and the co-channel interfering signal each includes a training sequence, the joint demodulation filter comprising an input configured to receive samples of the desired signal and the co-channel interfering signal, a decoder, a first signal path between said input and said decoder comprising a first finite impulse (FIR) filter, a second signal path between said input and said decoder and comprising a modeler configured to generate a channel impulse response estimate for the co-channel interfering signal, a third signal path between said input and said decoder and comprising a second filter configured to generate a channel impulse response estimate for the desired signal, and a training-sequence locator upstream of said second and third paths and downstream from said input.

11. The wireless communications device of claim 10 wherein said third signal path comprises a desired-signal channel impulse response (CIR) estimator upstream of said second filter configured to generate a desired-signal CIR estimate.

12. The wireless communications device of claim 11 wherein said second signal path comprises a first summer and a second summer connected downstream therefrom.

13. The wireless communications device of claim 12 wherein said second signal path further comprises a remodulator between said desired-signal CIR estimator and said first summer and cooperating therewith for subtracting a remodulated desired-signal training sequence from samples of the desired signal and the co-channel interfering signal to thereby generate an interference signal estimate.

14. The wireless communications device of claim 10 wherein said modeler comprises a blind interference and CIR estimator, and a second FIR filter downstream from said blind interference and CIR estimator.

15. A method of operating a receiver of a wireless communications device, the method comprising:

filtering received samples of a desired signal and a co-channel interfering signal using a first signal path comprising a first filter;

generating a channel impulse response estimate for the co-channel interfering signal using a second signal path comprising a modeler;

generating a channel impulse response estimate for the desired signal using a third signal path comprising a second filter; and performing a decoding operation based upon the filtered received samples of the desired signal and the co-channel interfering signal, the channel impulse response estimate for the co-channel interfering signal, and the channel impulse response estimate for the desired signal using a decoder.

16. The method of claim 15 wherein the desired signal and the co-channel interfering signal each includes a training sequence; and further comprising performing a training-sequence location upstream of the second and third paths and downstream from the input.

17. The method of claim 15 wherein the third signal path comprises a desired-signal channel impulse response (CIR) estimator upstream of the second filter for generating a desired-signal CIR estimate.

18. The method of claim 15 wherein the first filter comprises a first finite impulse response (FIR) filter.

19. The method of claim 17 wherein the second signal path comprises a first summer and a second summer connected downstream therefrom.

20. The method of claim 19 wherein the second signal path further comprises a remodulator between the desired-signal CIR estimator and the first summer and cooperating therewith for subtracting a remodulated desired-signal training sequence from samples of the desired signal and the co-channel interfering signal to thereby generate an interference signal estimate.

* * * * *